United States Patent
Koester

(10) Patent No.: US 6,594,502 B1
(45) Date of Patent: Jul. 15, 2003

(54) DATING SYSTEM

(75) Inventor: Henry Koester, Bellflower, IL (US)

(73) Assignee: Singles Advantage, Bell Flower, IL (US)

( * ) Notice: Subject to any disclaimer, the term of this patent is extended or adjusted under 35 U.S.C. 154(b) by 0 days.

(21) Appl. No.: 09/384,801

(22) Filed: Aug. 27, 1999

(51) Int. Cl.[7] .................................................. H04M 1/64
(52) U.S. Cl. .................. 455/550; 379/88.11; 379/88.13
(58) Field of Search ........................... 379/67.1, 88.11, 379/88.13, 88.17, 88.18; 370/352; 707/3, 5, 6, 4, 102; 455/550, 575, 459; 380/49, 9, 29, 34

(56) References Cited

U.S. PATENT DOCUMENTS

| | | | | |
|---|---|---|---|---|
| 5,086,394 A | * | 2/1992 | Shapira | 364/419 |
| 5,668,880 A | * | 9/1997 | Alajajian | 380/49 |
| 5,710,557 A | * | 1/1998 | Schuette | 340/932.2 |
| 5,859,628 A | * | 1/1999 | Ross et al. | 345/173 |
| 5,920,845 A | | 7/1999 | Risemberg | |
| 6,061,681 A | * | 5/2000 | Collins | 707/5 |
| 6,243,375 B1 | * | 6/2001 | Speicher | 370/352 |
| 6,356,893 B1 | * | 3/2002 | Itakura et al. | 707/3 |

FOREIGN PATENT DOCUMENTS

WO    WO 98/24031 A1 * 6/1998 ........... G06F/13/00

* cited by examiner

*Primary Examiner*—Thanh Cong Le
*Assistant Examiner*—C. Chow
(74) *Attorney, Agent, or Firm*—Michael Berns; Maloney, Parkinson & Berns

(57) ABSTRACT

This invention relates to a dating service which allows potential dates to observe the users of the system in their automobiles. The preview of the person allows them to decide if they are compatible in age, attractiveness, and economic level. The potential date could then call a telephone service to hear a brief message about the person's interests and information, after entering in the automobile's license plate number. A voice message can then be left for the user of the system for anonymous contact.

12 Claims, 3 Drawing Sheets

DATING SYSTEM

BACKGROUND OF THE INVENTION

This invention relates to a dating service which allows potential daters to observe the users of the system in their automobiles. Recently, dating services have often utilized the Internet for possible date selections. This has left many users unavailable without access or necessary time to wade through profiles. Fraudulent information is often used by people in profiles, and profiles falsely created by dating services to increase attraction to the service and increase fees.

Personals ads in newspapers and local magazines have also long been used for dating selection. This requires long periods of time of calling for additional information about potential dates, and does not provide pictures of the people. In order to get a sufficient amount of customers, the services will bring together a large geographic area of people in the personals ads. Many people do not want to date outside their immediate area.

SUMMARY OF THE INVENTION

Today, many busy people are unable to spend time looking for dates. Time demands at work and home have restricted efforts at meeting new people. One source of increasing free time is in commuting time to work, and driving time. Single people often look at other drivers, looking for attractive people to meet. The automobiles rarely provide an opportunity for contact between drivers. There has not been a method of contacting a potential date, or discreetly signaling other drivers of your availability for dating.

The present invention provides a dating service based on automobile notification and contact using the automobile's license plate or other identifying information. Subscribers to the service will receive a sticker to display on their car. Other drivers can see that they are subscribers to the system and look at their faces, and make of vehicle. If they are interested in dating that person, they can call the telephone number and enter the vehicle's license plate number or identifying number on the sticker. The subscriber's recorder message should describe their interests, information, and objectives in dating. The recorder message may also list a telephone pager number, web site address with more information, or email address of the subscriber. The potential date can then leave a voice message, email, or page the subscriber, as desired or available. The subscriber may then respond to their potential dates.

Varying levels of anonymity can be provided for security. Potential dates will know the subscriber's vehicle, but cannot get a telephone number, name, or address, unless provided in future communications. This allows users to signal their availability, but maintain security, until relatively confident of the other person's reliability.

DETAILED DESCRIPTION OF THE PREFERRED EMBODIMENT

Figure 1:
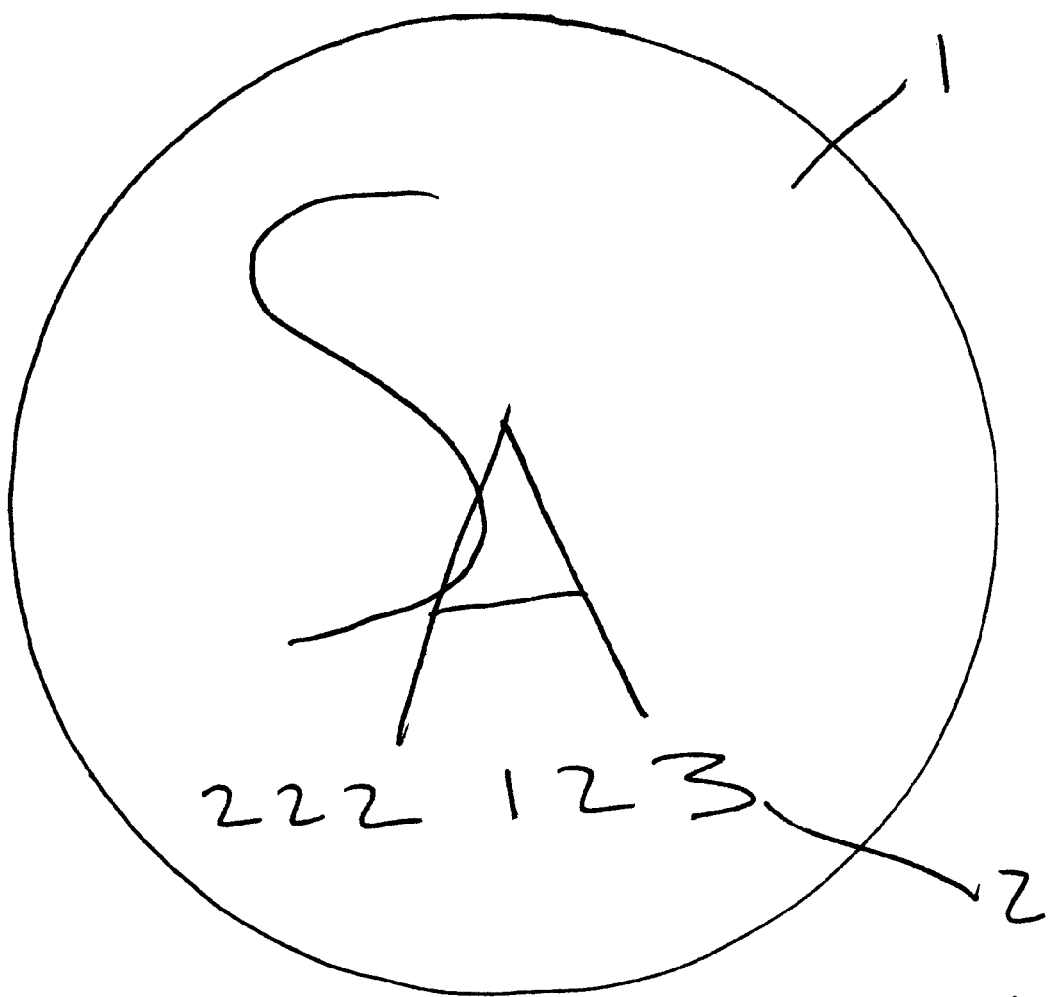
FIG. 1 is an illustration of a sticker used to identify a user and their identification number.
Figure 2:
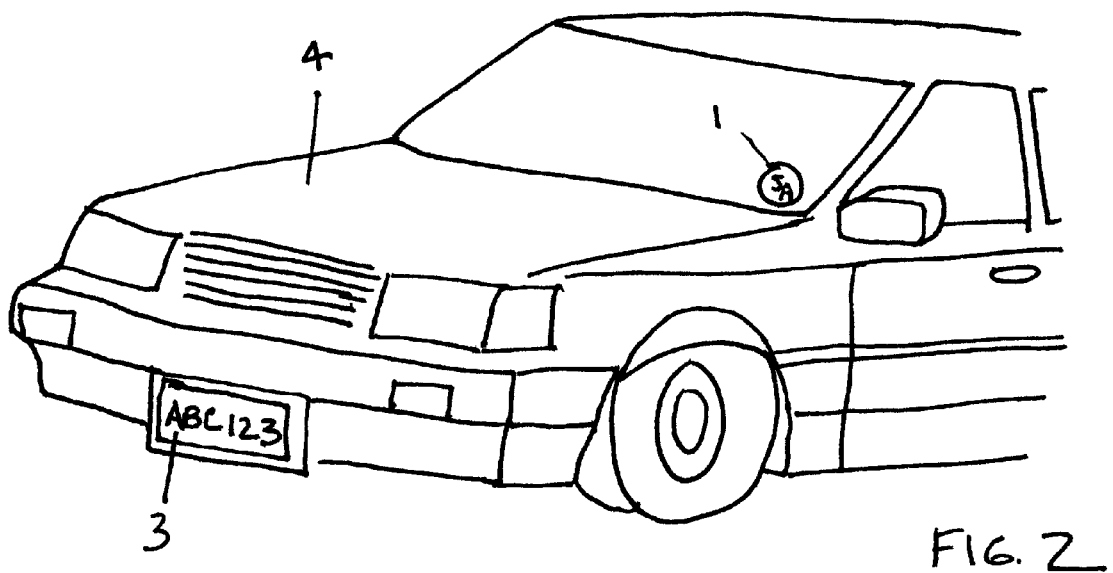
FIG. 2 is an illustration of a sticker affixed to an automobile.
Figure 3:
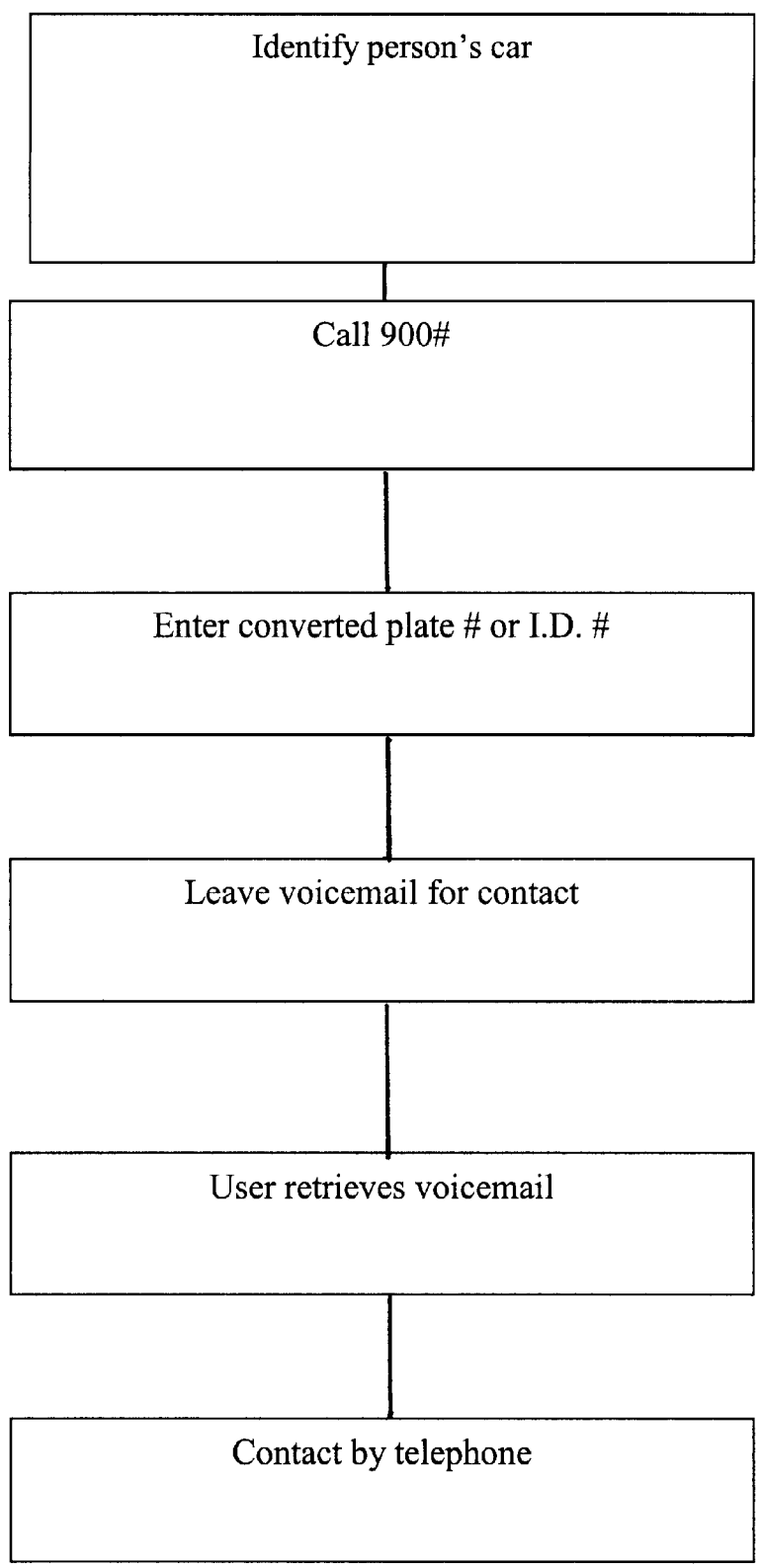
FIG. 3 is a flowchart of an embodiment of the invention.

A dating system according to the present invention has subscribing members who have registered information about themselves. In a preferred embodiment, this would be a voice message providing information about the subscriber, the subscriber's interests, and dating preferences. In another embodiment, the subscriber's information would be provided on the Internet, possibly providing pictures, recordings, and additional information.

The dating system subscriber would display a sticker on their automobile indicating they were a member of the service, and possibly providing means of contacting the service, either a telephone number, or an Internet web site URL address. Potential dates could contact the dating service to obtain the background information on the subscriber, using a touch-tone phone.

The information would be linked to the license plate number of the automobile, an identifying number on the sticker, an Internet web site URI address, or an email address. For the preferred embodiment, the license number would be converted to voice mailbox of the subscriber. A telephone number, possibly a toll charge number, or "900" number, would be used, possibly different telephone numbers for each state, based on the license plate of the vehicle. The potential date would then enter the license number onto the keypad of the telephone to access the subscriber's voice mailbox message.

Letters of the license plates would be converted to the corresponding numerals on a telephone. "A", "B", and "C" would correspond to a numeral "2", "D", "E", and "F", would correspond to the numeral "3", and so on for the matching letters on a standard telephone keypad. "Q" and "Z" are not on a standard telephone keypad. These letters could be transferred so that "Q" corresponds to a numeral "7", along with "P", "R", and "S", and "Z" corresponds to a numeral "9" along with "W", "X", and "Y", "Q" and "Z" could similarly be shifted to the numeral "1", which is vacant on the standard telephone keypad. Spaces in the license plate would preferably be ignored.

For example, the license plate "SA 100" would correspond to voice mailbox "72100". The license plate "TOY 303" would correspond to voice mailbox "869303". Recreational vehicle, handicapped plates, and other specialty plates could be accommodated by the telephone system. If an incorrect voice mailbox number, or a voice mailbox number with multiple plates was incurred, the system could provide an option for selection of the proper box.

In another embodiment, the subscriber's license number or identification number can be entered into the dating system's Internet web site for information on the subscriber. Pictures, voice messages, text, movies, many types of information can be revealed, at the subscriber's will. The potential date can leave an email message for the subscriber's anonymous email address, send an instant message, or provide other means of contact to the subscriber, along with means for returning a message, via telephone, email, instant message, pager, or other communication.

Once the potential date has contacted the subscriber, the subscriber may return contact via a number of methods of communication, or through the dating service, to provide further background security. If both parties are agreeable, they can arrange a date.

The dating service can charge the subscribers for storing information, based on the length of personal information stored, either on a web site, or on a telephone voice mailbox, or charge a subscriber a flat fee. Potential daters can be charged for accessing personal information on subscribers, through a "900" telephone number to the voice mailbox system, or through charges on a web site. Once the subscriber and potential date have their personal information, they may, choose to contact each other directly. They may choose to continue to work through the dating service for added security.

I claim:

1. A dating system comprising:
   (a) at least one subscriber, having personal data regarding dating,
   (b) a potential dater, selecting a subscriber for a possible date,
   (c) assigning an identifying code to each subscriber, the identifying information being displayed on the subscriber's automobile,
   (d) a telephone-based control system for providing the personal data about a subscriber to the potential dater, upon receiving the identifying code for a selected subscriber entered into the telephone.

2. The dating system according to claim 1, wherein the identifying information is a subscriber's license plate number.

3. The dating system according to claim 2, wherein the subscriber's license plate number is converted to numerals, using the conversions of a standard telephone keypad.

4. The dating system according to claim 1, wherein the identifying information is an identification numeral.

5. The dating system according to claim 1, wherein the control system includes means for communication from the potential dater to the selected subscriber.

6. The dating system according to claim 1, wherein the control system is a telephone voice mailbox system.

7. The dating system according to claim 1, wherein the control system is an Internet web site.

8. The dating system according to claim 1, wherein the identifying information is an email address.

9. The dating system according to claim 1, wherein the identifying information is an Internet web site address.

10. The dating system according to claim 6, wherein the telephone voice mailbox system is contacted through a toll telephone call.

11. The dating system according to claim 1, wherein the potential dater pays a control system operator for providing personal data about a subscriber.

12. The dating system according to claim 1, wherein the subscriber pays a control system operator for providing personal data to a potential dater.

* * * * *